Patented Jan. 20, 1942

2,270,756

UNITED STATES PATENT OFFICE 2,270,756

COLORING COMPOSITION

Jean G. Kern, Buffalo, N. Y., assignor to Allied Chemical & Dye Corporation, a corporation of New York No Drawing. Application February 25, 1939, Serial No. 258,574

22 Claims. (Cl. 8—40)

This invention relates to the art of coloring, particularly the art of dyeing and printing fibrous materials, such as textile materials and paper. It relates especially to a process for increasing the solubility of coloring materials such as dyestuffs, dye intermediates, and dye assistants and to improved compositions obtainable by this process.

In the manufacture and use of dyestuffs, dye intermediates, and dye assistants it frequently becomes important to increase the solubility of compounds of these classes, i. e., to render water-insoluble compounds relatively soluble and to increase the solubility of compounds that are considered soluble in water or in other aqueous media in which they are used.

Thus, the compounds that are generally referred to as dyes for materials made of or comprising organic derivatives of cellulose (such as cellulose esters and ethers, of which cellulose acetate is the outstanding example) are usually amine bases such as aminoanthraquinone compounds or amino azo compounds that are insoluble in water and, prior to use, must be "solubilized" in some manner; for example, these dyes are frequently applied in the form of colloidal dispersions prepared with the use of dispersing agents such as, for example, Turkey red oil.

Also, in the preparation of azo dyes in situ or in the presence of the fiber the ease and success with which the preparation is carried out depends in a large measure upon the solubility in water of the diazotizable amine, either before or after diazotization. To achieve this solubility it is usually necessary to carry out the diazotization in the presence of a strong acid such as hydrochloric acid.

The vat dyes represent another class of coloring materials that must be solubilized prior to application to the fiber to be dyed. This is accomplished by reducing the vat dyes in an alkaline vat, in an alkaline printing paste in the presence of the fiber, or by passing the fiber impregnated with the unreduced dye through an alkaline reducing solution. While the reduced vat dyes are relatively soluble in alkaline solutions they are substantially insoluble in neutral solutions, and hence can be used only with difficulty for dyeing materials that are deleteriously affected by alkalies, such as animal fibers.

Also, the azo dye coupling components (such as the 2,3-hydroxy naphthoic acid arylides and other components generally known as Naphthol AS compounds) are sufficiently soluble for application to textile materials only in relatively strongly alkaline solutions or pastes and hence are difficult to use for coloring materials sensitive to alkalies.

The solubility characteristics of the familiar vat dye printing catalysts (such as 1,6-dihydroxy-anthraquinone, 1-aminoanthraquinone, silver salt—beta-anthraquinone sulfonic acid—and the like) have an important effect upon the value of these catalysts, since they frequently precipitate by crystallization from vat dye color pastes and vat dye printing pastes and cause scratches on the copper printing roller and streaks on the surface of the printed fabric. Further, in the use of these catalysts in vat dye color pastes, it frequently occurs that in the screening operation involved in the preparation of such pastes the catalysts are retained by the screen in the form of coarse crystals, with the result that the final pastes contain insufficient amounts of the catalysts. Also, such catalysts at times crystallize out of vat dye color pastes and collect at the bottom of the containers in which the pastes are stored.

The present invention is concerned with a means of increasing the solubility of coloring materials in general, of which the above-referred to coloring materials represent outstanding examples.

The process of the present invention comprises treating dyestuffs, dye intermediates, and dye assistants with xanthinic bases, such as xanthine itself and derivatives thereof, and especially caffeine. It has been found that this treatment, which may be carried out simply by mixing a xanthinic base with a coloring material, has the effect of increasing the solubility of these materials to a greater or lesser extent depending upon the specific xanthinic base used and the character of the coloring material. Thus, the invention provides a means for improving the dyeing or other properties of many of these coloring materials and in some cases makes it possible to employ the coloring materials in an entirely new way. In addition to the process, the invention includes the compositions which comprise essentially a xanthinic base and a coloring material normally having relatively unsatisfactory solubility characteristics. In the compositions the coloring material and xanthinic base may be merely in admixture or may be in the form of a reaction product.

Xanthinic bases have been previously used in medicinal compositions such as caffeine sodium salicylate, caffeine sodium benzoate, theobromine sodium salicylate, etc. However, in these cases the object was to solubilize the caffeine or theobromine so as to render it useful for medicinal purposes. Thus, Thorpe's "Dictionary of Applied Chemistry," 4th d. (1938) Vol. II, page 197, in referring to the use of caffeine in medicine says: "Combinations of caffeine with sodium benzoate or sodium salicylate, on account of their greater solubility, are used for injections." This is borne out by the fact that sodium benzoate and sodium salicylate are much more soluble than caffeine (62.5 parts, 125 parts and 2.2 parts per 100 of water at 25° C., respectively). It is therefore surprising to discover that xanthines, particularly caffeine which is so insoluble that it must be solubilized to be of use in medicinal compositions, can be used to solubilize many insoluble or sparingly soluble compounds.

The class of xanthinic bases consists of xanthine itself and derivatives of xanthine. Xanthine may be represented by the following formula:

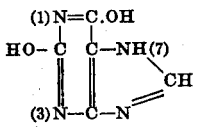

The xanthinic bases have an amphoteric character depending upon the nature of the substituents. It has been found that the solubilizing effectiveness of the various xanthinic bases in the present process varies according to whether the xanthine ring system is substituted by one or more aliphatic groups, and in particular by one or more alkyl groups which may be substituted by other radicals so long as these radicals do not appreciably affect the amphoteric character of the molecule. Thus, substituents in the 1,3, or 7 position, such as methyl, ethyl, hydroxy ethyl, or, in general, hydroxy aliphatic groups, produce compounds with a maximum efficiency in solubilizing action.

Some examples of xanthinic bases which I have found to be effective solubilizing agents are xanthine itself, 1-methyl xanthine, heteroxanthine (7-methyl xanthine), theophylline (1,3-dimethyl xanthine), paraxanthine (1,7-dimethyl xanthine), theobromine (3,7-dimethyl xanthine), 1-hydroxyethyltheobromine (1-hydroxyethyl-3,7-dimethyl xanthine), caffeine (1,3,7-trimethyl xanthine), and epiguanine (7-methyl-guanine). Epiguanine has the following structural formula:

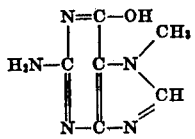

The xanthinic bases display a particularly noticeable solubilizing action upon water-insoluble organic bodies (e. g., water-insoluble coloring materials) that possess at least one amino or substituted amino and/or one or more hydroxyl groups in their molecules. The xanthinic bases are also especially capable of increasing the solubility of organic compounds, which may or may not be relatively soluble, which contain groups tending to induce solubility in neutral or alkaline aqueous solutions. Groups of this type are, for example, sulfo, carboxy, sulfato, phosphato, sulfamino, —$SO_2$—NH—, omega sulfo groups and the like, and alcoholic hydroxy groups. In addition to the foregoing groups, these sparingly soluble to soluble compounds may contain amino or phenolic hydroxyl grups as substituents together with other substituents ordinarily present in coloring materials. It will be noted that the above-described compounds all contain in their molecules a group tending to induce solubility in acid, alkaline, or neutral solutions, and furthermore, that these groups are generally regarded as possessing acid or alkaline character. For example, the amino group is alkaline in character and tends to induce solubility in acid solutions, while the phenolic hydroxyl group is acid in character and tends to induce solubility in alkaline solutions.

While the invention is not to be limited to any theoretical explanation, it appears possible that the xanthinic bases are particularly valuable for increasing the solubility of compounds of the above classes because these bases are amphoteric in character and hence should be capable of undergoing reaction with groups having acid or alkaline characteristics. In the appended claims when solubilizing groups are referred to it will be understood that groups tending to induce solubility in acid, alkaline, or neutral solutions are intended unless otherwise indicated.

As examples of compounds having the above characteristics and to which the present invention has an especial application, the following may be mentioned: anthraquinone derivatives, anthraquinone azo derivatives, benzene or naphthalene derivatives, diazoamino compounds, leuco vat dyes, reduced sulfur dyes, derivatives of beta-naphthol such as the arylides of 2,3-hydroxy naphthoic acid, the arylides of 2-hydroxy-carbazole-3-carboxylic acid, other coupling components known in the art, hydroxyanthraquinone, aminohydroxyanthraquinone, and aminoanthraquinones and their sulfonated and/or carboxylated derivatives.

As pointed out above, the solubility-promoting property of xanthinic bases may be advantageously utilized in textile dyeing and printing for preparing readily soluble coloring materials. Their use, in general, results in obtaining better fixation, greater brilliancy, and greater dye strength. I have found that these solubilizing properties of the xanthinic bases are especially valuable for the preparation of water-soluble dyes from the water-insoluble compounds such as aminoanthraquinone compounds and amino azo compounds conventionally used for dyeing cellulose esters and cellulose ethers. The water-soluble dyes prepared in this way are especially valuable dyes for coloring materials made of or comprising these esters and ethers, and particularly cellulose acetate. These dyeing compositions are distinguished by excellent dyeing characteristics and the fact that use of the usual adjuvants necessary for proper fixation of this class of special dyes, such as dispersing agents, swelling agents, solvents, and the like may be entirely dispensed with.

In connection with water-insoluble dyestuffs, and especially the water-insoluble anthraquinone dyestuffs which are suitable for dyeing cellulose acetate fibers, it has been found as a special feature of this invention that a particularly advantageous method of producing a water-soluble form of the dyestuff is to form a solid solution of the dyestuff in the xanthinic base. Thus the xanthinic base can be melted and while in a molten state the finely ground dyestuff added and thoroughly mixed therewith; the solution allowed to cool to form a solid solution which then may be finely ground to form a convenient and readily soluble form of the dyestuff. Also any other method of producing an intimate mixture of a xanthinic base and dyestuff may be used; such as grinding together, heating together or heating in the presence of a solvent for either the dyestuff or the xanthinic base.

The amount of xanthinic base employed for increasing the solubility of a dyestuff will vary considerably. In general, the optimum amount employed in a particular case will depend upon a number of factors, including the solubility of the dyestuff, the character of the substituents present therein, and the specific xanthinic base used. Where the invention is practiced for the purpose of increasing the solubility of a dyestuff having substantial solubility, ordinarily a relatively small amount of the xanthinic base is required, although in general an excess is not undesirable. On the other hand, where the invention is practiced to render a water-insoluble coloring material (for example, a cellulose acetate dyestuff) soluble, it has been found that on the average a ratio of about 4 parts of xanthinic base to 1 part of dyestuff by weight is satisfactory. This optimum weight ratio, however, may vary from about 1:1 to about 10:1 of xanthinic base to dyestuff. In the case of the water-insoluble coloring materials, also, an excess of xanthinic base above that required to cause maximum solubility generally is not unsatisfactory.

The difficulty with poor solubility has in the past been particularly noted in dyes for cellulose esters or ethers, i. e., cellulose acetate dyes. The difficulty manifested itself by irregular dyeing or poor leveling. As noted above, when applied to cellulose acetate dyes the solubilizing process of this invention has been found to be particularly efficacious. Thus, when a mixture of 1-amino-4-hydroxy-anthraquinone with caffeine is used, dyeings of great brilliancy and excellent uniformity are obtained as compared with the usual dye bath made by dispersing the dyestuff with ordinary dispersing agents. The presence of caffeine makes the use of various soaps, swelling agents and/or dispersing agents unnecessary, although such aids may be used if desired.

When anthraquinone or its derivatives such as the usual anthraquinone vat dyes, or other dyes of the indigoid and thioindigoid series, or sulfur dyes are reduced, it has been found that the reduced form of these dyes can be brought into solution without the presence of strong alkali, as required in prior practice. Thus the reduced dye is simply mixed with a xanthinic base, preferably caffeine, and the resulting composition is found to be sufficiently soluble to form dye solutions which may be applied to fibers of various natures, in particular cellulose acetate fabrics, without the use of alkalies.

Another important application of this invention is in coloring with mixtures of stabilized forms of diazotized aromatic amines and coupling components or developers, for example Rapidogen colors; i. e., colors comprising stable diazoamino or diazoimino compounds and suitable coupling components, such as arylides of 2,3-hydroxy naphthoic acid. Thus it has been found that caffeine forms with 2,3-hydroxy naphthoic acid and its arylides (e. g., the anilide or o-anisidide or o-toluidide or beta-naphthylide of 2,3-hydroxy naphthoic acid) white crystalline products which dissolve very readily in dilute caustic alkali solutions. This property is of importance when Rapidogens and related or similar colors are employed on fibers of animal origin which are very sensitive to alkaline reagents.

A valuable application of the solubilizing action of xanthinic bases resides in the preparation of more readily soluble vat dye printing catalysts; such as, 1,6-dioxyanthraquinone, 1-aminoanthraquinone, silver salt (beta-anthraquinone sulfonic acid), etc. For example, with the use of caffeine, highly concentrated solutions of these catalysts may be obtained, and the said solutions may be added to vat dye pastes or vat dye printing pastes without fear of precipitation by crystallization which ordinarily frequently occurs and usually causes scratches on the copper printing roller and streaks on the surface of the printed fabric to appear.

In many instances during the course of preparation of vat dye pastes, the rather insoluble printing catalysts consisting, for example, of silver salt, are retained by the screen in the form of coarse crystals in the ultimate stages of screening, with the result that the end products contain insufficient amounts of the catalysts and thus yield vat dye pastes of inferior quality. It is also not infrequent that the silver salt crystallizes out in the pastes and collects at the bottom of the containers in which the pastes are handled or stored.

If, however, two to three parts of caffeine are added to each part of silver salt contained in a silver salt solution, the solubility of the latter is considerably increased and with it a homogeneous composition is obtained in which the full effects of the presence of the catalyst is realized.

Isatin is another example of a dye intermediate which can be readily solubilized by xanthines, particularly caffeine and theobromine, in the absence of alkalies.

The solubilizing process of this invention may be applied to aid in diazotizing such compounds as insoluble aromatic amines which are otherwise insoluble even in the presence of various acids such as hydrochloric, sulfuric, and acetic acids. When these compounds are brought into the solubilized state by the xanthine base they may be subjected to chemical reactions such as diazotization and thereafter may be reacted with a wide range of suitable coupling components so as to form directly soluble modifications of normally insoluble azo dyes that may be recovered from the reaction mixture. Thus, for example, alpha- or beta-aminoanthraquinone can be conveniently diazotized under normal conditions, i. e., without the difficult solubilization in concentrated sulfuric acid required by the prior art. In the presence of caffeine the aminoanthraquinone compound forms a soluble complex salt which may be diazotized by means of hydrochloric or acetic acid and sodium nitrite. This can then be coupled into amino and/or phenolic or enolic hydroxyl-bearing coupling components. The resulting azo compound may be recovered without further treatment in a soluble form.

The solubilizing ability of the xanthinic bases, particularly caffeine, for difficultly soluble diazotizable amines makes it possible to produce effective dyeings by applying to the fabric to be dyed a thickened composition comprising the amine, caffeine, a coupling component (such as an arylide of 2,3-hydroxy naphthoic acid), and an alkali metal nitrite. On passing the material containing this composition through an acid ager or through an acid solution (such as a solution of acetic and formic acids), the amine is diazotized and formation of the dyestuff is effected.

It has been found that xanthinic bases, in particular caffeine, when added to reduced vat dye pastes or solutions, have the effect of retarding the oxidation of said vat dyes and thus effect a leveling action. This retarding and leveling action, particularly in the case of caffeine, is due to the formation of rather stable soluble leuco vat dye salts, which are probably complexes with the xanthinic base and possess great stability toward reoxidation and excellent solubility in aqueous or alkaline solutions.

The mechanism of solubilization involved in the process and compositions of the present invention has not definitely been determined. However, it appears probable that this mechanism varies somewhat in character according to whether the xanthinic bases, which, as above indicated, are amphoteric in nature, are used to solubilize compounds of neutral, amphoteric, acid, or basic character. There is some evidence that a chemical reaction takes place during the solubilization. This is shown by the fact that many of the solubilized compounds revert readily upon cooling of their hot aqueous solutions to compounds of a crystalline nature, which are soluble in water and very probably are the result of a complex molecular association of the components in which the amphoteric xanthinic bases act as bases or acids, according to the character of the compounds to be solubilized.

In connection with the operation of the present process it will be understood that its value will vary in particular cases. In many cases the increase in solubility of the compounds subjected to treatment with a xanthinic base is particularly noticeable; e. g., insoluble compounds are converted to freely soluble compounds. In some cases, however, the process may be of limited value. Nevertheless, the process constitutes an important addition to the present art, since it provides a means for improving the properties of coloring materials in general, and is of marked value in most cases.

As indicated in the above discussion, caffeine is the preferred xanthinic base for use in the present invention. This compound may be used in the crude form or purified form, and it will be understood that in speaking of caffeine in the specification and claims either of these forms is intended. In this connection it has been found that crude caffeine as obtained by the decaffeination of coffee or tea displays somewhat better solubilizing properties than the pure product. This is due probably to the presence as impurities of other homologues of the xanthine bases and/or the presence of other naturally occurring impurities.

The following examples, in which the parts are by weight, illustrate this invention:

*Example 1.*—One part of 1-amino-4-hydroxyanthraquinone in the dry state is intimately mixed with five parts of caffeine (for example, by grinding in a rotary ball mill) until a homogeneous mixture is obtained. The mixture is a cellulose acetate dye which when treated with water goes entirely into solution and displays a remarkable affinity for cellulose esters and cellulose ethers, which are dyed pink thereby.

It is to be noted that in this example no dispersing agents, soaps, swelling agents, or solvents are used, since they are unnecessary. The actual dyeing may be effected under ordinary conditions; that is, entering the cellulose acetate material cold into the dye bath which contains the above composition dissolved therein, working the material lukewarm for 10 or 15 minutes, and then slowly raising the temperature to 80° C., at which temperature satisfactory dyeing and exhaust of the dye bath are effected within a short time.

The composition of the dye mixture as obtained according to this example can also be obtained by fusion (melting) of the components. Thus, theobromine and caffeine can be melted and the dye or compound to be solubilized can be added in a finely ground form to the melt which is then cooled and solidified so as to give a solid solution. This solid solution is then ground to a fine powder which may be added to an aqueous dye bath to give excellent dyeings.

If the above composition is dissolved in hot water and allowed to cool, it will be noted that a dark-colored crystalline compound is obtained which when filtered off retains its solubility in hot water. The exact composition of this crystalline composition has not been determined; however, it is probably a compound which may be represented by the general formula:

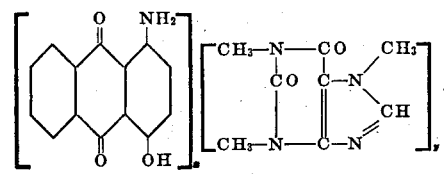

where $x$ and $y$ are integers 1, 2, or 3 or more, according to whether excess of either one of the components is used. In the above example $x:y=1:5$.

It may be noted that when these dye-caffeine compositions are used for dyeing cellulose acetate, there is evidence of the presence of caffeine in the fiber after the dyeing process is over. Thus, the murexide reaction effected on the dyed fiber indicates the presence of caffeine in said fiber. This seems to indicate that the caffeine becomes a part of the dyestuff itself.

*Example 2.*—One part of 1,4-diaminoanthraquinone is mixed either molten or dry with four parts of caffeine. This resulting mix, when dissolved in a dye bath and applied to cellulose acetate fibers, results in a very brilliant purple dyeing. Other additions to the dye bath may be used, of course, although this is not necessary in view of the high solubility of the composition in hot aqueous solutions.

*Example 3.*—One part of 1-ethylamino-4-methylaminoanthraquinone and three parts caffeine are intimately mixed either mechanically or in a ball mill or by melting together, and thus a water-soluble brilliant blue dye for cellulose acetate is obtained which possesses all the properties of the compositions given in the foregoing examples.

The various anthraquinone bases of the above examples may be replaced by any one of the compounds given in the table below and the caffeine may be replaced by any one of the xanthinic bases disclosed above. The ratio $x/y$ (where $x$ indicates the amount by weight of dyestuff and $y$ the amount by weight of xanthinic base used for the preparation of the composition) represents preferred proportions of the components for obtention of optimum results.

solving these dyestuff compositions in water and thickening with an appropriate amount of a textile gum thickener, a printing paste results which can be applied to fabrics composed of mixed fibers, e. g., cellulose acetate and wool or cellulose acetate and silk, to obtain perfect union prints.

| Dyestuff or intermediate ($x$) | Xanthinic base ($y$) | Ratio $x/y$ | Shade |
|---|---|---|---|
| 1-amino-2-methyl-anthraquinone | Caffeine | 1:5 | Orange. |
| 1,4-diaminoanthraquinone | Theobromine. | 1:4 | Violet. |
| 1-amino-4-hydroxy-anthraquinone | Paraxanthine. | 1:5 | Pink. |
| 1-amino-4-chloranthraquinone | Caffeine | 1:3 | Orange. |
| Quinoline Yellow Base (C. I. 800) | ___do___ | 1:8 | Yellow. |
| 1,4-dimethyl-diamino-anthraquinone | Theobromine. | 1:4 | Blue. |
| 1-amylamino-4-methyl-aminoanthraquinone | Caffeine | 1:4 | Do. |
| Amino-azotoluene | Xanthine | 1:10 | Yellow. |
| Phenyl-azo-phenyl-methyl-pyrazolone | Caffeine | 1:8 | Golden yellow. |
| 4-chlor-2-nitro-diphenylamine | ___do___ | 1:4 | Orange. |
| 1-ethylamino-4-methyl-aminoanthraquinone | Theophylline. | 1:3 | Blue. |
| 1-benzylamino-4-methyl-aminoanthraquinone | Caffeine | 1:3 | Do. |
| 1-ethylamino-4-hydroxyanthraquinone | ___do___ | 1:4 | Purple. |
| 1-amylamino-4-hydroxyanthraquinone | ___do___ | 1:4 | Red. |
| Amino-azobenzene | ___do___ | 1:10 | Yellow. |
| 1-benzylamino-4-hydroxanthraquinone | ___do___ | 1:4 | Pink. |
| 1,4,5,8-tetramino-anthraquinone | ___do___ | 1:4 | Blue. |
| Azo Yellow ASW (C. I. 146) | ___do___ | 1:1 | Brilliant yellow. |
| Wool Violet 4BN (C. I. 698) | Theobromine. | 1:2 | Brilliant violet. |
| Chromophenine FKN (C. I. 892) | Caffeine | 1:2 | Dark navy blue. |
| Modern Violet Base | Epiguanine | 1:2 | Violet. |

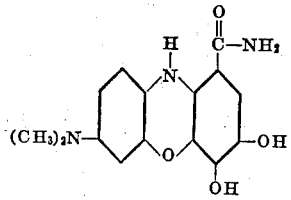

| | | | |
|---|---|---|---|
| 1-aminoanthraquinone-5-sulfo acid or Na salt | Epiguanine | 1:2 | Orange. |
| 1-aminoanthraquinone-2-carboxylic acid or Na salt. | Caffeine | 1:3 | Orange. |

*Example 4.*—50 parts of 1,4,5,8-tetraminoanthraquinone are intimated mixed with 200 parts of crude caffeine and ground into a fine powder (160-mesh screen). The mixture thus obtained is dissolved in hot water and, after dilution to proper dye bath concentration cellulose acetate yarn is worked therein for about one-half hour at a temperature varying from 50 to 75° C. A very brilliant blue dyeing is thus obtained.

As a rule, a 4% dyeing (that is 4 parts of the dye mixture as above obtained for 100 parts of yarn) produces a full shade of blue.

*Example 5.*—40 parts of the product obtained according to Example 1 are dissolved in 20 parts of ethyl ether of ethylene glycol and 320 parts of hot water are added. To this solution, 520 parts of textile gum thickener are then added and the whole is worked into a smooth printing paste by proper stirring.

Cellulose acetate fabrics are printed therewith, steamed for 20 minutes to one hour in moist steam under 5 pounds pressure, then washed, soaped, rinsed, and dried. A beautiful pink print of good brilliancy and good penetration is thus obtained.

Certain of the dye compositions of this invention comprise dyestuffs which display affinity not only for cellulose acetate and cellulose ether fibers but also for other fibers, such as wool and silk. Examples of such dyestuffs are Azo Yellow ASW (C. I. 146), Wool Violet 4BN (C. I. 698), and Chromophenine FKN (C. I. 892). By dis- The compositions can be used also for dyeing union fabrics of a similar nature.

The dye compositions of this invention may be admixed with many other dyestuffs which display no affinity for cellulose acetate silks and thus permit cross-dyeing and/or cross-printing to obtain beautiful multicolor effects.

*Example 6.*—This example illustrates the application of the present invention to the solubilization of insoluble diazotizable amines. 23 parts of alpha-aminoanthraquinone are intimately mixed with 90 parts of crude caffeine and the mixture is introduced into 2000 parts of hot water and permitted to stand until the solution is complete. The solution is then cooled to room temperature, at which time 8 parts of solid sodium nitrite are added. To the solution, cold hydrochloric acid is added little by little until the anthraquinone diazonium salt formation is completed and the resultant solution possesses a distinct mineral acidity. The solution is then made neutral to Congo red paper with sodium acetate, after which the anthraquinone diazonium compound is ready to couple into any suitable coupling component.

Thus it may be coupled into an equivalent amount of hexamethylenetetramine to produce the bis-diazoanthraquinone compound of pentamethylenetetramine described in my copending application Serial No. 118,992, or it may be made to couple into equivalent amounts of any suitable coupling component in order to produce anthraquinone azo dyes. The general procedure of the above example may be employed with advantage in the preparation of diazonium compounds of the other diazotizable amines disclosed in application Serial No. 118,992, which then may be employed in a similar manner to the anthraquinone diazonium compound of the example.

Xanthinic bases have the property of solubilizing diazoamino compounds obtained by coupling an aromatic diazonium compound into an amine which possesses free hydroxyl and/or amino groups, the presence of other solubilizing radicals, e. g., —COOH or —SO₃H, not being necessary. The following example illustrates a process in which advantage is taken of this property of the xanthinic bases.

*Example 7.*—4 parts of caffeine are used to readily solubilize one part of the diazoamino compound obtained from diazotized 4-chlor-2-aminotoluene and diethanolamine. The resulting composition can be used in equivalent molecular amounts with the toluidide of 2,3-hydroxy naphthoic acid. This solubilized composition may then be applied to any fibers by means of printing or dyeing methods commonly used in the application of these products. Upon acidic treatment, a fast red print or a fast red dyeing is obtained, depending upon the particular process used.

In the dyeing and printing of paper, exceptional solubility is often required to insure thorough penetration and covering, uniform speck-free surfaces, high brilliancy, etc. Some direct colors do not display entirely satisfactory solubility for the dyeing of paper. The following example illustrates a method for increasing the solubility of a direct dye so as to improve its dyeing properties.

*Example 8.*—20 per cent of caffeine is added to and thoroughly mixed with Erie Red 4B, having the following formula:

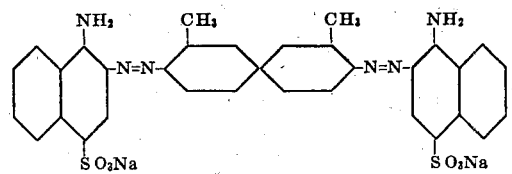

Solubility of the resultant composition is materially increased over that of the dyestuff alone, so that the composition produces dyeings of increased strength and brilliancy as compared with the dyeings produced by the dyestuff alone.

The process of solubilization of this invention is also suitable for the production of insoluble azo dyes on textile fibers, and in particular on cellulose esters and cellulose ethers. Thus, the aromatic bases generally used for the formation of such azo dyestuffs on the fiber are solubilized by means of the xanthinic bases and are applied in a fashion and under conditions similar to the compounds of the preceding examples. The resulting colorless or faintly colored fiber thus obtained (the color largely depends on the dyeing ability of the aromatic bases per se), upon treatment with acetic acid or hydrochloric acid and sodium nitrite, is converted within the fiber to the corresponding aromatic diazonium compound and subsequently is developed with any suitable coupling component to yield the azo coloring matter.

The table below illustrates a few such examples.

| Intermediate (x) | Xanthine base (y) | Ratio x/y | Coupling component | Shade |
|---|---|---|---|---|
| 2,5-dichlor-1-aminobenzene | Caffeine | 1:3 | Diacetoacetic o-tolidide | Yellow. |
| 3-chlor-1-aminobenzene | do | 1:3 | 2-hydroxy-naphthalene-3-carboxylic acid-o-toluidine. | Orange. |
| 4-chlor-2-amino-1-methylbenzene | Hydroxy-ethyl-theo-bromine. | 1:4 | 2-hydroxy-naphthalene-3-carboxylic acid-o-phenetitide. | Scarlet. |
| 2-amino-4-methoxy-5-benzoylamino-1-chlorbenzene. | Caffeine | 1:5 | 2-hydroxy-naphthalene-3-carboxylic acid-o-toluidide. | Violet. |
| 4-chlor-2-amino-1-methylbenzene | do | 1:4 | Sodium compound of 2-hydroxy-naphthalene-3-carboxylic acid-o-anisidide. | Red. |
| 6-amino-3-benzoylamino-1,4-diethoxy-benzene. | do | 1:5 | Sodium compound of 2-hydroxy-naphthalene-3-carboxylic acid-o-toluidide. | Blue. |
| 4-chlor-2-amino-1-methylbenzene | do | 1:4 | Sodium compound of 2-hydroxy-carbazole-o-carboxylic acid-2'-toluidide. | Brown. |
| Alpha-aminoanthraquinone | do | 1:5 | Phenyl-methyl-pyrazolone | Golden yellow. |
| Beta-aminoanthraquinone | Theobromine | 1:4 | Beta-hydroxy-naphthoic acid | Scarlet. |
| 1-amino-4-chlor-anthraquinone | Caffeine | 1:4 | Meta-toluene-diamine (2 mols) | Full black. |
| 1-aminoanthraquinone-4-thiosalicylic acid. | do | 1:3 | Meta-toluene-diamine | Gold. |
| Alpha-alpha'-diamino-dianthraquinonyl | do | 1:5 | do | Dark reddish brown |
| 1-methylamino-4-para-aminophenyl-aminoanthraquinone. | do | 1:5 | Phenol | Green. |
| 1-oxy-4-(4'-amino)-phenylamino-anthraquinone. | do | 1:5 | Diacetoacetic o-tolidide | Do. |

As noted above, the use of the xanthinic bases makes possible the application of azo dyes to textile materials by impregnating the materials with a paste or solution comprising, in addition to the xanthinic base, a diazotizable amine, a coupling component, and an alkali metal nitrite, drying, and then subjecting the materials to the action of an acid; for example, by passing the materials through an acid ager or a solution of acetic and formic acids. The following examples illustrate this process.

*Example 9.*—142 parts meta-chlor-toluidine (2-amino-4-chlor-toluene) are dissolved in 1000 parts ethyl alcohol; then add 200 parts caffeine dissolved in 750 parts hot water; mix the two solutions, apply heat if necessary, and add 69 parts sodium nitrite dissolved in 200 parts cold water and a solution of 300 parts Naphthol AS-D sodium salt (100%) dissolved in 200 parts ethyl alcohol and adjust the solution with 339 parts of water to a total of 5000 parts.

This solution corresponds to 2.84% meta-chlor-toluidine base content. This solution is then used further as follows: 30 parts of the above base solution are thickened up with 70 parts starch tragacanth thickening paste,—total 100 parts,—and the printing paste thus obtained is applied to a fabric which may be composed of rayon, cotton, cellulose acetate, wool or silk or mixtures thereof, the print thereafter being dried, preferably in a hot air dryer.

The cloth thus printed and dried is then either passed through an acid ager during two minutes or more, after which a very brilliant azo red dye is developed, or the printed fabric may be passed directly in an acid solution composed of 40 ccs. acetic acid and 10 ccs. formic acid per liter, and containing 50 grams sodium sulfate, at a temperature which may vary from 30° to 70° C. A red print is thus developed.

After either treatment, the cloth is then rinsed in cold water, soaped, and dried.

It is interesting to note that when proceeding with the printing and development of the above compositions of matter, the azo coloring matter may be developed in the absence of steam simply by exposing the print to acid fumes in a warm atmosphere. Thus, prints may be developed at an extremely low temperature, for example, at 50° C. Such developments at low temperatures in many instances are of advantage.

*Example 10.*—128 parts of 3-chlor-1-aminobenzene are dissolved in 1000 parts ethyl alcohol, to which solution 150 parts caffeine dissolved in 750 parts water are added. Thereafter 69 parts of sodium nitrite dissolved in 200 parts of water are added to the above solution as well as 300 parts Naphthol AS-D sodium salt (100%) dissolved in 2000 parts ethyl alcohol, and the whole solution is adjusted with 403 parts of water to a total of 5000 parts of azo print color solution.

This solution is applied in a way similar to the one illustrated in the above example. After acid development a very brilliant orange is formed on the textile fabric.

The azo coloring solutions prepared according to the above examples may also be used in dyeing. For that purpose, 100 parts of the above azo base solution is diluted with water containing gum arabic or gum tragacanth, and the fabric padded therewith and dried, preferably in a hot flue. After drying, the goods may be subjected to acid ageing or to passage through an acid solution, whereby a uniform dye shade of the coloring matter is developed.

*Example 11.*—A printing paste made in the same manner as in Example 9 above, but with an azo base solution containing an equivalent amount of 2,5-dichloraniline, 200 parts caffeine, and the equivalent amount of sodium salt of 2-hydroxy-3-naphthoic acid-2',5'-dimethoxyanilide as a coupling component, yields after acid treatment a fast brown azo print on cotton.

*Example 12.*—In a similar manner, a solution prepared according to the above procedure but using an equivalent amount of 2,5-diethoxy-4-benzoylaminoaniline and equal parts of caffeine and equivalent amounts of sodium nitrite and Naphthol AS-D sodium salt, when made into a printing paste, applied to the fabric, and subsequently subjected to acid treatment, will yield a fast blue print.

In Examples 9 to 12 the xanthinic bases used therein may be replaced by any one of the xanthinic bases herein disclosed. It has been found, however, that caffeine generally gives the best results. Also the aromatic bases used in these examples may be replaced by other aromatic bases employed in the art, a number of which are disclosed in my copending application Serial No. 242,745. For example, these aromatic bases may be replaced by any aromatic base shown in the foregoing tables. It will be understood the solutions of Examples 9 to 12 may be applied cold or hot and the prints or dyeings may be developed cold or hot in the presence of either free acids (preferably organic) or of acid-reacting or acid-regenerating agents, for example, quaternary ammonium salts, ethylene dichloride, mannitol-dichlorhydrin, glycerine-dichlorhydrin, the quaternary condensation products of the above chlorhydrins with pyridine or with triethanolamine, etc.

It should be noted that in all of the above examples the xanthinic bases may be used in either their pure or crude form. Thus, pure caffeine or crude caffeine as extracted from coffee and tea may be used. As noted above, this crude caffeine has been found to give slightly better results than the pure product.

I claim:

1. A process of increasing the solubility of an organic coloring material containing at least one solubilizing group in the molecule which comprises incorporating a xanthinic base with said coloring material.

2. A process of increasing the solubility of an organic dyestuff containing at least one solubilizing group in the molecule which comprises incorporating caffeine with said dyestuff.

3. A process of increasing the solubility of an anthraquinone dyestuff having affinity for cellulose acetate which comprises incorporating a xanthinic base with said dyestuff.

4. The improvement in the process of diazotizing an aromatic amine, which comprises carrying out the diazotization of said amine in the presence of a xanthinic base.

5. The improvement in the process of diazotizing an insoluble aromatic amine, which comprises carrying out the diazotization of said amine in the presence of caffeine.

6. In the process of coloring a textile material with an azo dyestuff comprising applying an aromatic amine to said material, diazotizing said aromatic amine, and coupling the resulting diazotized amine with a coupling component, the improvement which comprises applying said aromatic amine to said material in admixture with caffeine.

7. A process of coloring a textile material which comprises applying a composition comprising an aromatic amine, a xanthinic base, a coupling component and a nitrite to the material, and acidifying the material to form an azo dyestuff therein.

8. A process of preparing a composition comprising an organic coloring material containing at least one solubilizing group in the molecule, which composition possesses increased solubility over said coloring material, which comprises preparing a mass comprising said coloring material and a molten xanthinic base, and cooling said mass to form a composition comprising a solid solution of said coloring material in said xanthinic base.

9. A process of preparing a composition comprising a dyestuff having affinity for cellulose acetate, which composition possesses improved solubility over said dyestuff, which comprises preparing a mass comprising said dyestuff and molten caffeine, cooling said mass to form a composition comprising a solid solution of said dyestuff in caffeine, and converting said solid solution to a finely divided form.

10. A composition for coloring comprising an organic coloring material containing at least one solubilizing group in the molecule, and a xanthinic base.

11. A composition for coloring comprising an organic coloring material containing at least one solubilizing group in the molecule, and caffeine.

12. A composition for coloring comprising a dyestuff having affinity for cellulose acetate and a xanthinic base.

13. A composition for coloring comprising an organic dyestuff containing at least one solubilizing group in the molecule, and a xanthinic base.

14. A composition for coloring comprising a xanthinic base and an anthraquinone coloring material containing at least one solubilizing group.

15. A composition for coloring comprising an azo coupling component and a xanthinic base.

16. A composition adapted for application to textile materials in a weakly-alkaline paste comprising a stable form of a diazotized aromatic amine, a coupling component, and a xanthinic base.

17. A composition adapted for application to textile materials in a weakly-alkaline paste comprising an amine-stabilized form of a diazotized aromatic amine, an arylide of 2,3-hydroxynaphthoic acid, and caffeine.

18. A composition for coloring comprising a solid solution of a dyestuff having affinity for cellulose acetate in caffeine.

19. A composition for coloring comprising an azo dyestuff and a xanthinic base.

20. A composition for coloring comprising an azo dyestuff containing at least one solubilizing group and caffeine.

21. A composition for coloring comprising a solid solution of an organic coloring material containing at least one solubilizing group in the molecule, in a xanthinic base.

22. A composition for coloring comprising a solid solution of an organic dyestuff containing at least one solubilizing group in the molecule, in caffeine.

JEAN G. KERN.